United States Patent
Guicheteau

[11] 3,896,355
[45] July 22, 1975

[54] SELF-POWERED THYRISTOR TRIGGER CIRCUIT

[75] Inventor: Eugene H. Guicheteau, Audubon, Pa.

[73] Assignee: Honeywell Inc., Minneapolis, Minn.

[22] Filed: June 13, 1974

[21] Appl. No.: 478,944

[52] U.S. Cl. ............. 318/207; 307/252 B; 318/256; 318/288; 318/297; 318/345; 323/24; 323/25
[51] Int. Cl. .............................. H02p 1/40
[58] Field of Search. 307/252 B; 318/207 R, 207 A, 318/207 B, 207 C, 252, 256, 257, 288, 297, 345, 351, 356, 202, 203, 227; 323/23–25

[56] References Cited
UNITED STATES PATENTS

| | | | |
|---|---|---|---|
| 3,268,742 | 8/1966 | Pinckaers | 307/248 |
| 3,444,448 | 5/1969 | Welch | 307/252 B |
| 3,517,217 | 6/1970 | Sleater et al. | 307/241 X |
| 3,525,925 | 8/1970 | Lord | 323/17 |
| 3,528,103 | 9/1970 | Wolf | 318/227 X |
| 3,541,412 | 11/1970 | Worth | 318/345 X |
| 3,568,019 | 2/1971 | Hirokawa et al. | 318/227 X |
| 3,699,390 | 10/1972 | Blakeslee | 307/252 B X |
| 3,743,903 | 7/1973 | Horn | 318/227 X |
| 3,818,310 | 6/1974 | Smith | 321/18 |

Primary Examiner—William M. Shoop
Attorney, Agent, or Firm—Arthur H. Swanson; Lockwood D. Burton

[57] ABSTRACT

A power control circuit includes first and second triacs each having a pair of load terminals connected across a pair of alternating current supply terminals in series with an individually associated winding of a split phase capacitor alternating current motor, and control circuit means for providing a unidirectional gating potential for said triacs in a low-loss non-heat producing or power dissipating manner comprising a filter capacitor having a first terminal connected to the junction of one of the supply terminals a load terminal of each of said triacs, said filter capacitor having a second terminal connected to the other power supply terminals by first and second circuits each of which circuits include a current limiting capacitor and a rectifier, and switching means selectively operable to apply said potential to the control gate of one or the other of said triacs.

6 Claims, 1 Drawing Figure

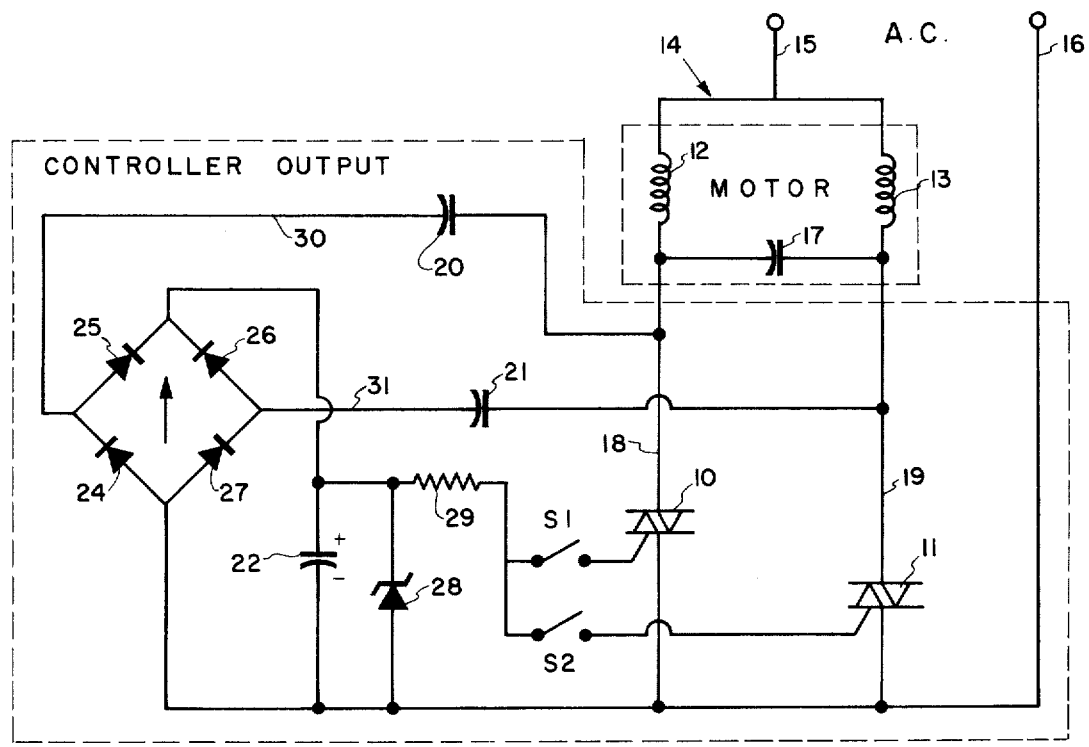

SELF-POWERED THYRISTOR TRIGGER CIRCUIT

BACKGROUND OF THE INVENTION

1. Field of the Invention

This invention relates to alternating current power control circuitry and more particularly to a self-powered thyristor gating or trigger circuit. The invention is concerned with improvements in a gating circuit for gate controlled semiconductor devices such as triacs that have utility as static switches for replacement of the prior art mechanical switches and relays for controlling the energization of loads such as reversible electrical alternating current motors.

2. Description of the Prior Art

A triac is a bidirectional three-electrode semiconductor switch which can be triggered into conduction by a gate signal. Because of their bidirectional characteristic, triacs have found wide use in applications involving alternating current power control. One such application is in the control of alternating current reversible electrical motors for selective rotation in one direction or the other. In effecting such control, a gating signal is supplied from a suitable source of power to the gate electrode or terminal of the triac that is to be rendered conductive. Direct current gating signals having magnitudes appropriate for the triacs being controlled may be provided from an independent source or may be derived from the alternating current power source that is connected in circuit with the main or load terminals or electrodes of the triacs. When the gating signal is so derived a transformer or voltage dropping resistor has been employed in the gating circuit to reduce the power line voltage to the appropriate gating signal level. For applications involving components of small size and requiring low output power for the trigger signals, transformers have been found to be objectionable because of their bulk; also voltage dropping resistors have been found to be undesirable for use in such applications because of their dissipation of power and the resultant heat. Thus, in applications involving printed circuit board construction, for example, it is desired to avoid the use of bulky transformers. Additionally, it is desirable to avoid the use of heat producing resistors because of the need to provide means to dissipate the heat produced and to provide special mountings for such heat producing resistors to avoid interference with and even damage to other circuit components and also to the circuit board.

SUMMARY OF THE INVENTION

An object of the present invention is to provide an improved power control circuit for producing gating signals for power semiconductor load carrying gate controlled conducting devices.

Another object of the invention is to provide such an improved circuit that avoids heat dissipation effects and in which the circuit components may be of small size.

Still another object of the invention is to provide such an improved circuit for selectively controling the direction of energization of a reversible electrical motor wherein inadvertent triggering of the triacs for operation of the motor in both directions simultaneously results in disruption of the gating signals to both triacs, thus turning off both triacs and deenergizing the motor.

In accomplishing these and other objects there have been provided in accordance with the present invention an improved gating circuit for producing a gating signal that may selectively be employed to control one or the other of a pair of triacs. When used with a reversing-type split capacitor motor, the pair of triacs provide a reversing motor control. The gating circuit includes capacitors and the diodes so arranged as to derive in a low loss, non-heat producing manner, a direct current trigger signal from the alternating line voltage power source that energizes the motor, which gating signal may selectively be employed to gate on one or the other of the pair of triacs thereby selectively to energize the motor for rotation in one direction or the other. The trigger circuit features disruption of the gating signals to both triacs and turning off of the latter in the event of inadvertent gating on of both triacs simultaneously.

BRIEF DESCRIPTION OF THE DRAWINGS

A better understanding of the present invention may be had from the following detailed description when read in connection with the accompanying drawing which is a schematic circuit illustrating a preferred embodiment of the invention.

DETAILED DESCRIPTION OF THE EMBODIMENT

Referring to the drawing triacs 10 and 11 are shown connected in circuit with windings 12 and 13, respectively, of a reversible capacitor-type electrical motor 14. Motor windings 12 and 13 comprise inductive impedance loads; if desired, other inductive impedance loads such as relay windings may be employed in lieu thereof. The junction of the motor windings 12 and 13 is connected by a supply line 15 to one terminal of an alternating current source. The other terminal of the alternating current source is connected by a supply line 16 to a common terminal of the triacs 10 and 11. A capacitor 17 is connected between the terminals of the motor windings 12 and 13 that are remote from the line 15. The latter terminals of motor windings 12 and 13 are connected by conductors 18 and 19, respectively, to an individually associated load terminal of the triacs 10 and 11. Triacs 10 and 11 may be high current rating triacs, for example, RCA types 40927. Each of the triacs includes a pair of load terminals, and a control gate terminal.

With this arrangement, when triac 10 selectively is rendered conductive by proper actuation of its gate circuit, a circuit is established for the flow of alternating current from the source directly through motor winding 12, and through motor winding 13 in series with capacitor 17. Such current flow is effective to establish a rotating field in the motor that produces rotation in one direction. When triac 11 selectively is rendered conductive, the capacitor 17 is placed in series with the motor winding 12 instead of winding 13 whereby a rotating field is established that produces rotation of the motor in the opposite direction.

As indicated by the dotted lines, the motor 12, in a practical embodiment of the invention, may be located at a position remotely situated with respect to the control circuit in which the triacs are embodied. The motor 14, for example, may be arranged to adjust the position of a control valve for regulating the flow through a pipe of a gas, liquid or solid.

Triacs 10 and 11 are selectively fired by triggering signals or pulses that are connected to their respective gate electrodes upon the selective closure of switches S1 and S2. Switches S1 and S2, for convenience of illustration, have been shown as being of the mechanically contacting type, but it will be understood that electronic switches embodying no movable parts may be employed, if desired. As is known, triacs 10 and 11 have the property of conducting substantially equally well in both directions in accordance with the alternations of the alternating voltage applied to their principal electrodes. Once fired conduction continues until the alternating current through the triac drops below a minimum holding value, at which time the triac becomes non-conductive.

The gating signal that is arranged to be applied to the gate terminals of the triacs 10 and 11 upon closure of the switches S1 or S2 is derived from the alternating current voltage source by a circuit including low-loss circuit components comprising current limiting capacitors 20 and 21, a filter capacitor 22, diodes 24, 25, 26 and 27, a Zener diode 28 and a resistor 29. As shown, the diodes 24 to 27 are connected in a bridge arrangement with a junction of adjacent diodes 24 and 25 being connected by a conductor 30 and capacitor 20 to the conductor 18 which connects triac 10 to the motor winding 12. A diagonally opposite junction of the diode bridge is connected by conductor 31 and capacitor 21 to the conductor 19 which connects the triac 11 to the motor winding 13. Capacitor 22 and Zener diode 28 are connected in parallel across the other diagonally opposite junctions of the diode bridge, one of which junctions is connected to the principal electrodes of triacs 10 and 11 remote from the motor winding. The other of said junctions is connected by a resistor 29 to a common junction of the switches S1 and S2.

With this arrangement, when switches S1 and S2 are both open, a unidirectional potential is developed across the filter capacitor 22. Such potential is limited to a desired value by the Zener diode 28. Thus, if due to line voltage variations, for example, potential across the capacitor 22 tends to rise higher than the desired value, the Zener diode 28 breaks down, in known manner, to preclude rise of the potential across capacitor 22 above the desired value.

When the triacs 10 and 11 are both turned off, that is, are not conductive, the motor is not energized for rotation in either direction. At such time, however, during the positive half cycle of the alternating current voltage power supply, for example, when the supply line 15 is positive with respect to line 16, current flows through capacitors 20 and 21 and individually associated diodes 25 and 26 into filter capacitor 22. Such current flow is operative to store a charge on capacitor 22 of the polarity indicated in the drawing. During the negative half cycle of the alternating current supply voltage, when line 16 is positive with respect to line 15, current flows through the diodes 24 and 27 and through respectively associated capacitors 20 and 21, but does not establish a charging current flow to capacitor 22. Thus, charging of the capacitor 22 does not occur during the said negative half cycle.

Upon selective closure of switch S1, for example, triac 10 is turned on to effect energization of the motor for rotation in one direction. When triac 10 is turned on, the voltage applied to the circuit including capacitor 20 drops substantially to zero whereby charging current to the capacitor 22 from the charging source is discontinued. Because of the connection of the motor capacitor 17 in the circuit, however, and as those skilled in the art will understand, twice the line voltage, typically, appears at conductor 19 which connects triac 11 and motor winding 13. This higher voltage is effective to produce sufficient charging current to the filter capacitor 22 through the circuit including capacitor 21, in consequence of which there is substantially no reduction of the charging current flow into the capacitor 22 notwithstanding the discontinuation of the charging current through capacitor 20.

Upon energization of the motor for operation in the reverse direction, by turning on triac 11, the charging current through capacitor 21 into the capacitor 22 is discontinued. The charging current into the capacitor 22 from the circuit including the capacitor 21 now becomes twice as much however, whereby, again, there is substantially no reduction in the quantity of charging current flow into the capacitor 22.

In this manner, closure of switch S1 or S2 is effective to produce energization of the motor 14 for rotation in a selected direction. At the same time the direct current flow required to charge the capacitor 22 is maintained thereby to maintain the needed gating signal to that one of the triacs 10 or 11 that has been turned on. Suitable provisions may be made, as those skilled in the art understand to effect closure of the switches S1 and S2 only on zero crossing of the voltage across the triacs 10 and 11, whereby to minimize radio frequency disturbance and other undesirable actions which otherwise may tend to occur.

A desirable feature of the circuit arrangement illustrated and described is that if both switches S1 and S2 should inadvertently be triggered simultaneously, the voltage across both triacs 10 and 11 will become substantially zero. As a result, charging current flow into the capacitor 22 will immediately cease since the voltage across the circuits including capacitors 20 and 22 will also simultaneously become substantially zero. Consequently, the trigger signal across the filter capacitor 22 will rapidly fall below that value required to turn on the triacs 10 and 11, and both triacs will be turned off.

Thus, there has been provided in accordance with the present invention an improved trigger circuit for producing controlling gating signals for triacs in which a desired direct current gating signal may be derived from the main alternating current power source by low loss, non-heating or power dissipating components of small size thereby facilitating use of printed circuit construction, which gating signal source is so arranged in a triac reversing motor circuit that upon inadvertent application of the source to command operation of the motor in opposite directions simultaneously, the trigger circuit source is quickly disrupted to turn off both of the triacs, thereby avoiding damage to both the motor and the triacs.

The embodiments of the invention in which an exclusive property right is claimed are defined, as follows:

1. A power control circuit including in combination first and second semiconductor load carrying gate controlled conducting devices each having a pair of load terminals connected in series circuit relationship with an individually associated inductive impedance load across a pair of alternating current power supply terminals, and control circuit means coupled to and controlling said gate controlled conducting devices comprising means for providing a unidirectional gating potential, said last mentioned means comprising a filter capacitor having a first terminal connected to the junction of one of said power supply terminals and one of said load terminals of each of said gate controlled conductive devices, said filter capacitor having a second terminal connected by first and second circuits to the other one of said power supply terminals, each of said first and second circuits including a rectifier, a current limiting capacitor and an associated one of said load devices, and gating means operatively coupled to said filter capacitor and selectively operable to be coupled to the control gate of one or the other of said load current carrying gate controlled conducting devices for applying a gating-on signal to said device to cause the same to conduct load current therethrough.

2. A power control circuit as specified in claim 1 including a voltage limiting diode connected across said filter capacitor.

3. A power control circuit as specified in claim 2 including a current limiting resistor connected in circuit with said gating means to limit the gating signal adapted to be applied by said gating means to said gate control conducting devices.

4. A power control circuit as specified in claim 1 including a capacitor connected between the junction of each of said loads and the associated load terminal of said gate control conducting devices.

5. A power control circuit as specified in claim 4 wherein said inductive impedance loads comprise the windings of a split capacitor reversible electrical motor.

6. A power control circuit as specified in claim 5 wherein said gating means include a switch associated with each of said gate controlled conduction devices, which switch is operable when closed to apply a gating signal to the device individually associated therewith to cause the said device to conduct load current therethrough.

* * * * *